United States Patent [19]

Liehr

[11] Patent Number: 5,686,513
[45] Date of Patent: Nov. 11, 1997

[54] PROCESS FOR THE PRODUCTION OF STABILIZER CONCENTRATE FOR POLYAMIDE

[75] Inventor: Hartmut Liehr, Buskow, Germany

[73] Assignee: Zimmer Aktiengesellschaft, Frankfurt, Germany

[21] Appl. No.: 706,737

[22] Filed: Sep. 9, 1996

[51] Int. Cl.[6] .................... C08K 5/47; C08K 5/3417
[52] U.S. Cl. .............. 524/83; 252/400.53; 252/401; 252/402; 252/403; 524/83; 524/227; 524/230; 524/606
[58] Field of Search ................... 524/606, 227, 524/230, 94, 83; 252/400.53, 402, 401, 403

[56] References Cited

U.S. PATENT DOCUMENTS

| | | | |
|---|---|---|---|
| 2,948,698 | 8/1960 | Cocci | 524/230 |
| 2,960,489 | 11/1960 | Gabler et al. | 524/413 |
| 3,308,091 | 3/1967 | Zapp | 524/83 |
| 3,471,426 | 10/1969 | Hofton | 524/230 |
| 3,505,285 | 4/1970 | Hermann et al. | 524/413 |
| 3,962,176 | 6/1976 | Bernert | 524/230 |
| 4,837,265 | 6/1989 | Istel et al. | 524/436 |

FOREIGN PATENT DOCUMENTS 45-994   1/1970   Japan.

*Primary Examiner*—Veronica P. Hoke
*Attorney, Agent, or Firm*—McDonnell Boehnen Hulbert & Berghoff

[57] ABSTRACT

A process for the production of a polyamide stabilizer concentrate in which the concentrate consists of at least two interactive stabilizer components with defined particle sizes and, optionally, micro-dispersed silicic acid, as well as a wax bonding agent with a solidification temperature $t_A$ between 65° and 120° C., in which a homogeneous mixture of these ingredients is compacted into tablets when subjected to a compression force p that is sufficient to heat the mixture to a temperature of at least 40° C. and equal to $t_A$ minus 10° to 50° C.

8 Claims, No Drawings

PROCESS FOR THE PRODUCTION OF STABILIZER CONCENTRATE FOR POLYAMIDE

BACKGROUND OF THE INVENTION

1. Field of the Invention

This invention relates to processes for the production of stabilizer concentrate for polyamides.

2. Summary of the Related Art

The physical-mechanical and thermal properties of thermoplastic polymers are closely related to their applications as textiles, industrial fibers and construction materials. The range of uses for polymers is being expanded constantly through modifications to the material. There is virtually no limit to the number of ways in which thermoplastic polymers can be modified or changed to meet specific needs by adding small or larger amounts of special active ingredients. For example, polyamide's light stability and particularly its thermal stability can be adjusted to conform to specific application requirements or new applications. Generally, master batch technologies are used to add special active ingredients. The procedure is as follows: First, a concentrate of one or more active ingredients is generated in or on a polymer carrier material. Using volumetric or gravimetric dosing systems, the desired final reduced concentration of the concentrate in the actual polymer is then continuously or intermittently added to the solid or molten polymer during processing.

The active ingredient concentrate or master batch is produced by spraying or rubbing the liquid or powdered additives onto the granular and pourable carrier material. The resulting product is then mixed intensively. Another type of master batch production is done when the polymers are in their liquid molten state. The additive or combination of additives is added to the polymer material through the lateral feed of a melting extruder and distributed in the resulting kneading zones throughout the polymer. Subsequently, the master batch melt is pulled in strand form through a cooling water bath and then granulated.

Both of these procedures have considerable disadvantages. The core and shell structures obtained through dusting are not stable in the face of vibration or motion, i.e., because of insufficient adsorptive forces, the additive powder is not capable of adhering permanently to the polymer carrier material, especially in multiple component systems. This leads to unwanted additive rub-off from some or all components during shipping, and subsequently to incorrect dosing during master batch processing. Storage and holding containers, as well as pipe lines, must be cleaned periodically, which results in production delays. In addition, the entire system is potentially susceptible to dust. This may cause safety-related problems in the work environment, such as excessive TLV values for toxic dusts or explosion hazards. Master batch technologies derived from polymer melts are highly equipment-intensive. However, their most serious disadvantage is that the additives used to modify the polymer are subject to heavy thermal or thermo-oxidative stress when exposed to normal processing temperatures in the range of 220°–290° C. Consequently, the additives can decompose and multiple components may enter into unwanted reactions with one another. In addition, active ingredient material is lost in the critical melting equipment's degassing zones.

Another proposal (Chemical Abstracts 111 (18): 155 202 b and 155 204 d for JP-A 01-081835 and 01-081836 (1989)) involves kneading and pelletizing filler material with a small mount of water and vinyl acetate bonding agent. However, the pellets or tablets that are made in this way are not very resistant to breakage or rub-off, which creates a safety hazard in terms of dust load, as well as causing problems during dosing.

Thus, the task of this invention is to design a production procedure for polyamide stabilizer concentrate in which the aforementioned disadvantages can be avoided as much as possible. It is of particular concern that the stabilizer concentrate remains as dust-free as possible during prolonged shipping, and that it is precisely apportionable.

SUMMARY OF THE INVENTION

The present invention provides an improved method of producing polyamide stabilizer concentrate. Surprisingly, it was determined that it is possible to obtain breakage-resistant and abrasion-resistant tablets from a stabilizer concentrate containing a multiplicity of stabilizer components and a wax bonding agent if the stabilizer components and the bonding agent are homogeneously mixed in the absence of liquid additives and without any additional heat and the resulting mixture compacted into tablets by subjecting it to a compression force p that heats the mixture to a temperature $t_c$ of at least 40° C. and equal to the was solidification temperature minus 10° to 50° C., wherein a) the wax bonding agent comprises an alkyl chain of at least 15° C. atoms and at least one acid, amide, and/or lower alkyl ester end group with a solidification temperature between 65° and 120° C. and optionally contains a micro-dispersed silicic acid, b) a portion of the stabilizer components have an average particle size of less than 2μ (microns) and the remaining portion of 2 to 200μ, and $c_1$) at least two of the stabilizer components react with one another while forming intermolecular solid state bridges, and/or $c_2$) at least two of the stabilizer components have different structures, defined as ionic structure and covalent structure, and fuse together when subjected to a temperature $t_c$ and a compression force p, so that their crystal structures become compacted.

The foregoing merely summarizes certain aspects of the invention and is not intended, nor should it be construed as limiting the invention in any way. All patents and other publications are hereby incorporated by reference in their entirety.

DETAILED DESCRIPTION OF THE PREFERRED EMBODIMENTS

The present invention provides a method in which it is possible to obtain breakage-resistant abrasion-resistant tablets from a stabilizer concentrate containing a multiplicity of stabilizer components and a bonding agent if the stabilizer components and the bonding agent are homogeneously mixed in the absence of liquid additives and without any additional heat and the resulting mixture compacted into tablets by subjecting it to a compression force p that heats the mixture to a temperature $t_c$ of at least 40° C. and equal to the wax solidification temperature, $t_A$, minus 10° to 50° C., wherein a) the bonding agent consists of a wax having an alkyl chain of at least 15 C atoms and at least one acid, amide, and/or lower alkyl ester end group and optionally contains a micro-dispersed silicic acid, wherein the wax has a solidification temperature $t_A$ between 65° and 120° C., b) 0.5 to 20 weight % of the stabilizer components, including the micro-dispersed silicic acid, have an average particle size under 2μ (microns), and the average particle size of the remaining 80 to 99.5 weight % ranges from over 2µ to 200µ, and $c_1$) at least two of the stabilizer components react with one another at a temperature of $t_c$ and a compression force of p while forming intermolecular solid state bridges, and/or $c_2$) at least two of the stabilizer components have different structures, defined as ionic structure and covalent structure, and fuse together when subjected to a temperature $t_c$ and a compression force p, so that their crystal structures become compacted.

In order to obtain compression-resistant molded objects when the stabilizer components are compacted into tablets, the capillary adhesive forces, adhesion and cohesion forces, intermolecular attraction (van der Waals forces) and/or solid state bridges and interlocking bonds among the individual particles in the various components are utilized to interlock larger particles with each other. These forces exist to varying degrees in the individual components that are normally used to stabilize polyamides. When selecting among known stabilizer products, it is important to make the correct qualitative and quantitative choices, so that by means of pressure, thrust, heat and the use of bonding agents, in fact, stabile molded objects are produced. In order to be successful, it is important to find a mixture whose individual components' stabilizing effects are known, but in which fine and coarse granular distribution exist side by side and which react with one another and/or have different crystal structures that become compacted by fusion with each other. In addition, it is important to use bonding agents that release their active ingredients quickly when subjected to plastification processes.

In principle, it is not important whether the stabilizer concentrate tablets are obtained through extruder presses, in which pan grinder heads rotate on flat matrix and press the powder mixture through open pressing channels and the resulting strands are cut into pellets, or through more or less high-speed eccentric presses or rotary machines in which stamp-like tools compact the product into tablets in closed molds, or though rotating robs on mold cavity beds in which briquettes are produced. The important point is that the compression forces are set in such a way that the intimate mixture of stabilizer components and bonding agent reaches a temperature $t_c$, which is at least 40° C. and equal to 10° to 40° C. below the bonding agent's solidification temperature $t_A$, without the application of additional heat. Preferably, the temperature $t_c$ should range between 50° and 80° C. The compression force needed to attain this temperature depends on the type of tablet-making machinery used. It is determined by gradually increasing applied compression force under otherwise constant conditions (throughput) until the desired temperature $t_c$ has been reached. The tablets (pellets or briquettes) should weigh between 5 and 50 mg and should be no longer than 10 mm; ideally, they should weight between 5 and 15 mg and be no longer than 5 mm.

The following bonding agents, which are added in amounts of 20 to 40% by weight of the stabilizer concentrate, may be used: tricosanoic acid, octadecanoic acid amide, triacontanoic acid amide, (bis-stearoyl)—ethylene—diamide, triacontanoic acid ethylester or triacontanoic acid butylester, or natural waxes. Other waxes with similar properties can also be used. Liquid additives (at $t_c$) are neither needed nor used.

Copper-I-chloride, copper-I-bromide or copper-I-iodide are suitable for use as one of the $c_1$) stabilizer components, while morpholine-N-disulphide, 2-mercapto-benzothiazol, 2-mercapto-benzimidazol, 2-mercapto-1-methyl-imidazol, 2-isopropyl thiophenol or diphosphorpentasulphide may be considered as the second stabilizer component $c_1$) (which reacts with the first stabilizer component).

Examples of materials that may be used as the stabilizer component $c_2$) with an ionic structure include potassium iodide or potassium bromide, copper-I-chloride, copper-I-bromide or copper-I-iodide, manganese-II-chloride or manganese-II-carbonate, or diphosphorpentasulphide. Examples of materials that may be used as the stabilizer component $c_2$) with a covalent structure include α-tolyl triazol 3,5-dihydroxybenzoic acid ethyl ester, 2,2'-bis (4-hydroxyphenyl)-propane, 4,4-dihydroxydiphenylsulphone, 2,6-di-tertbutyl-4-ethylphenol, 2,6-di-tertbutyl-p-cresol or bis (dimethyl-thiocarbamoyl)-disulfide.

Other stabilizer components that react with one another or fuse together can also be used. In principle, at least one pair of stabilizer components $c_1$) or $c_2$) must be present. Because of synergistic stabilizer effects and the stronger consistency of the resulting tablets, however, concentrates containing at least one pair of stabilizer components $c_1$) and one pair of stabilizer components $c_2$) are preferable. It not a requirement, however, that all stabilizer components be present as equimolar component pairs $c_1$) and/or $c_2$). If the granular size distribution specified in the invention is maintained, sufficient tablet solidity can also be attained if an excessive mount of one or more components is used because of its stabilizer effects. However, tablet solidity improves in direct proportion to the percentage of stabilizer component pairs. A proportion of 0.5 to 20 weight % of stabilizer components must be finely dispersed, i.e., its average particle size must be smaller than 2µ. If necessary, these finely dispersed components can be replaced by up to 2 weight % of the total concentrate of micro-dispersed silicic acid. The remaining portion (80 to 99.5 weight %) of the stabilizer components must have a particle size ranging from greater than 2µ to 200µ. Particularly stable tablets can be obtained if the mount of stabilizer components with an average particle size between 20 and 200µ is at least twice by weight the amount of the finely dispersed material.

The stabilizer concentrate tablets manufactured in accordance with the invention show outstanding resistance to abrasion and breakage and are easily apportionable. The tablets are added to the polyamide granulate—which is to be stabilized—either before or after melting, during their processing or molding, and in a quantity that corresponds to the desired final concentration, and are then homogeneously blended with the polyamide melt. The polyamides are defined as aliphatic, thermoplastic polyamides, such as polyamide-6, -6.6, -4.6, -6.12, -11 or -12, or as aliphatic-aromatic polyamides, such as poly (hexamethylenterephthalate) or poly (xylylenadipate).

The following Examples are presented for illustrative purposes only and are not intended, nor should they be construed, as limiting the invention in any way. Those skilled in the art will appreciate that variations on the following Examples can be made without exceeding the spirit or scope of the invention.

EXAMPLES

Example 1

30 parts by weight of 2-mercaptobenzimidazol (particle size: 20–200µ)

4 parts by weight of copper-I-chloride (20–200µ)

1 part by weight of 2-isopropyl-thiophenol (20–200µ)

3 parts by weight of 2,6,-di-tertbutyl-p-kresol (<2µ)

15 parts by weight of(bis-stearoyl)—ethylene-diamide ($t_A$ is approx. 80° C.) were blended homogeneously for 20 minutes in a tumbling mixer. The resulting powder mixture was poured at approx. 20° C. into the feeding hopper of a spiral conveyor and fed into the matrix of an extruder press through the pan grinder. At a pan grinder force of >60 bar exerted on the matrix, the powder mixture was compacted into pellet strands that were cut into 0.5–1.0 cm long pieces with a rotating knife underneath the matrix. The pellets exited the extruder press at a temperature of 63° C. and a unit weight of 5–10 mg. They retained their shape when placed in a rotating impact chamber for three minutes, or a total of 200 revolutions (increase in dust component <3%). The reaction between mercaptobenzimidazol and copper chloride, which produced benzimidazol copper mercaptate, resulted in the formation of solid state bridges inside the pellets. The various structures (copper chloride: ionic structure; mercaptobenzimidazol, isopropyl-thiophenol and di-tertbutyl-p-kresol: covalent structure) fused together into compacted crystalline structures and were bonded by the wax components.

Example 2

40 parts by weight of 2-mercapto-1-methylimidazol (particle size: 20–200μ)

5 parts by weight of copper-I-iodide (20–200μ)

2 parts by weight of diphosphorpentasulfide (20–200μ)

4 parts by weight of 2,6-di-tertbutyl-p-kresol (<2μ)

0.8 parts by weight of micro-dispersed silicic acid (<2μ)

20 parts by weight of octadecanoic acid amide ($t_A$ at approx. 103° C.) were blended homogeneously for 15 minutes at 60 RPM in a cone mixer manufactured by the Alfred Bolz Company, Wangen, Germany. The warm powder mixture (approx. 35° C.) was then fed along a web conveyor belt into an intermediate container with a cone-shaped discharge, from which it flowed by gravitational force onto the tools of a rotary pelleting machine, where it was compacted at 100 kN of compression force. At 30 RPM, tablets with a diameter of 3 mm were ejected from the molds every 0.24 seconds. The temperature of the tablets at ejection was 57° C. Each tablet weighed 30 mg and had a resistance to breakage of 25N.

The tablets' dimensional stability is provided through solid state bridges resulting from the reaction between diphosphorpentasulfide and 2-mercapto-1-methylimidazol, on the one hand, and copper iodide, on the other. The initial products' various matrix structures (copper iodide: ionic structure; mercaptomethylimidazol and di-tertbutyl-p-cresol: covalent structure) fused together into compacted crystal structures and were bonded by the wax component. The micro-dispersed silicic acid makes the product more free-flowing and decreases filling time for the tablet press molds.

I claim:

1. A method of producing a polyamide stabilizer concentrate containing a multiplicity of stabilizer components and a bonding agent, the method comprising homogeneously mixing the stabilizer components and bonding agent in the absence of liquid additives and without any additional heat and compacting the resulting mixture into tablets by subjecting it to a compression force p that heats the mixture to a temperature $t_c$ of at least 40° C. and equal to the wax solidification temperature, $t_A$, minus 10° to 50° C., wherein
   a) the bonding agent consists of a wax having an alkyl chain of at least 15 C atoms and at least one acid, amide, and/or lower alkyl ester end group and optionally contains a micro-dispersed silicic acid, wherein the wax has a solidification temperature $t_A$ between 65° and 120° C.,
   b) 0.5 to 20 weight % of the stabilizer components, including the micro-dispersed silicic acid, have an average particle size under 2μ, and the average particle size of the remaining 99.5 to 80 weight % ranges from over 2μ to 200μ, and
   $c_1$) at least two of the stabilizer components react with one another at a temperature of $t_c$ and a compression force of p while forming intermolecular solid state bridges, and/or
   $c_2$) at least one of the stabilizer components has a covalent matrix structure and at least one of the stabilizer components has an ionic structure, wherein said stabilizer components having molecular or ionic structures fuse together when subjected to a temperature $t_c$ and a compression force p, so that their crystal structures become compacted.

2. The method according to claim 1, wherein the bonding agent represents 20 to 40 weight % and the micro-dispersed silicic acid represents 0 to 2 weight % of the stabilizer concentrate.

3. The method according to claim 1, wherein at least two thirds by weight of the total stabilizer components have an average particle size between 20 and 200μ, while the remaining part, including the micro-dispersed silicic acid, has an average particle size under 2μ.

4. The method according to claim 1, wherein the stabilizer concentrate tablets weigh between 5 and 50 mg and are no longer than 10 mm.

5. A method according to claim 1, wherein the wax is a tricosanoic acid, octadecanoic acid amide, triacontanoic acid amide, (bis-stearoyl)-ethylene-diamide, triacontanoic acid ethyl ester or triacontanoic acid butyl ester, or a natural wax.

6. A method according to claim 1, wherein one of the stabilizer components according to $c_1$) is copper-I-chloride, copper-I-bromide or copper-I-iodide, while the other stabilizer component according to $c_1$) is morpholine-N-disulphide, 2-mercapto-benzothiazol, 2-mercapto-benzimidazol, 2-mercapto-1-methyl-imidazol, 2-isopropyl thiophenol or diphosphorpentasulfide.

7. A method according to claims 1, wherein the stabilizer component according to $c_2$) with the ionic structure is potassium iodide or potassium bromide, copper-I-chloride, copper-I-bromide or copper-I-iodide, manganese-II-chloride or manganese-II-carbonate, or diphosphorpentasulphide, and the stabilizer component according to $c_2$) with the covalent structure is α-tolyl-triazol 3,5-dihydroxybenzoic acid ethyl ester, 2,2'-bis (4-hydroxyphenyl)-propane, 4,4-dihydroxydiphenylsulphone, 2,6-di-tertbutyl-4-ethyl-phenol, 2,6-di-tertbutyl-p-cresol or bis (dimethyl-thiocarbamoyl)-disulfide.

8. A method according to claim 1, wherein the stabilizer concentrate tablets are added to polyamide requiring stabilization during its processing.

* * * * *